United States Patent
Bryant

(10) Patent No.: US 7,581,381 B2
(45) Date of Patent: Sep. 1, 2009

(54) DUCTED AIR POWER PLANT

(75) Inventor: Ashley Christopher Bryant, Taplow (GB)

(73) Assignee: Vtol Technologies Limited, Buckinghamshire (GB)

( * ) Notice: Subject to any disclaimer, the term of this patent is extended or adjusted under 35 U.S.C. 154(b) by 813 days.

(21) Appl. No.: 10/519,526

(22) PCT Filed: Jun. 27, 2003

(86) PCT No.: PCT/GB03/02770

§ 371 (c)(1), (2), (4) Date: Dec. 27, 2004

(87) PCT Pub. No.: WO2004/002821

PCT Pub. Date: Jan. 8, 2004

(65) Prior Publication Data

US 2005/0223694 A1    Oct. 13, 2005

(30) Foreign Application Priority Data

Jun. 28, 2002  (GB) ................................ 0214961.5
Jan. 20, 2003  (GB) ................................ 0301177.2

(51) Int. Cl.
*F02K 1/00*  (2006.01)
*B64C 29/00* (2006.01)

(52) U.S. Cl. .............................. 60/228; 60/229; 60/230; 244/12.5; 244/23 D

(58) Field of Classification Search ........... 60/228–230, 60/226.1, 226.2; 244/12.4, 12.5, 23 D, 53 R, 244/23 B
See application file for complete search history.

(56) References Cited

U.S. PATENT DOCUMENTS

| 3,117,750 A | | 1/1964 | Snell |
| 3,155,342 A | * | 11/1964 | Bölkow et al. ............. 244/12.5 |
| 3,341,154 A | * | 9/1967 | Howes ....................... 244/194 |
| 3,769,797 A | | 11/1973 | Stevens |
| 4,222,233 A | * | 9/1980 | Johnson et al. ............... 60/225 |
| 4,713,935 A | * | 12/1987 | Szuminski et al. ............ 60/229 |
| 5,297,388 A | * | 3/1994 | Nightingale ................. 60/229 |
| 5,666,803 A | | 9/1997 | Windisch |
| 2002/0020167 A1 | | 2/2002 | Hubbard |

FOREIGN PATENT DOCUMENTS

| DE | 195 45 253 A1 | 11/1995 |
| GB | 851379 | 10/1960 |
| GB | 861480 | 2/1961 |
| GB | 899862 | 6/1962 |
| GB | 905651 | 9/1962 |
| GB | 955013 | 4/1964 |
| GB | 1 252 077 | 11/1971 |
| GB | 1 473 088 | 5/1977 |
| WO | WO-00/15497 | 3/2000 |

\* cited by examiner

*Primary Examiner*—Michael Cuff
*Assistant Examiner*—Gerald L Sung
(74) *Attorney, Agent, or Firm*—Davis & Bujold, P.L.L.C.

(57) ABSTRACT

A ducted air power plant, comprising a motor driven fan (7) situated in a duct (4), the fan (7) having an air intake side and in operation providing a high pressure air stream in the duct, and the fan being located adjacent air splitter mechanism (18), the air splitter mechanism (18) being arranged to divert the air stream into two or more subsidiary streams for delivery to respective jet nozzles (9) of the plant. The plant may be used in a vehicle such as an aircraft in order to provide a vertical take-off and hover capability as well a level flight power source.

7 Claims, 4 Drawing Sheets

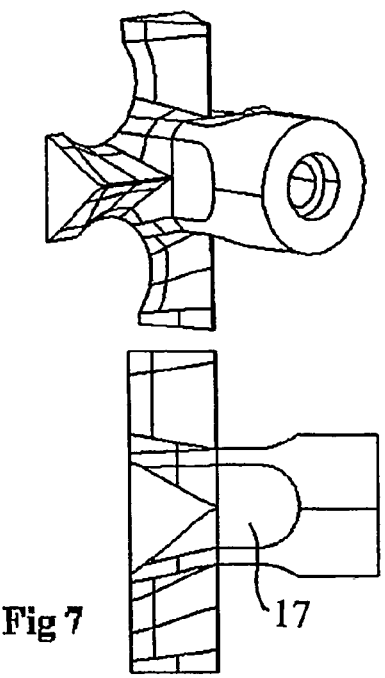
Fig 7
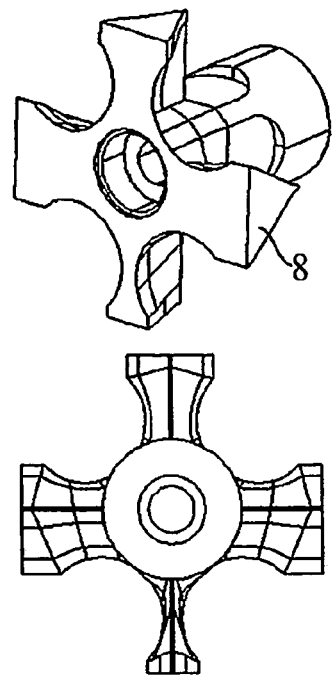
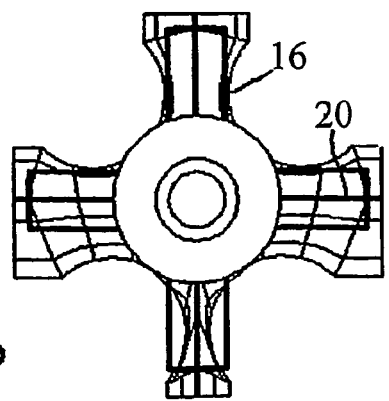
Fig 8
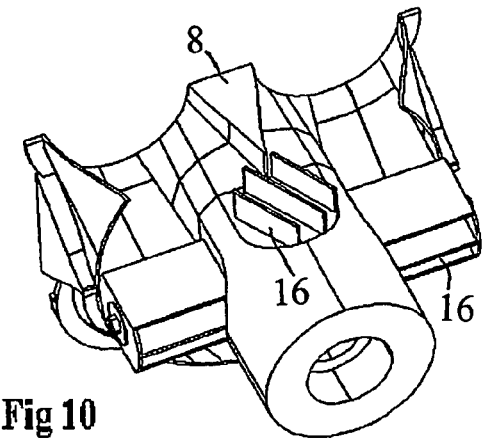
Fig 10
Fig 9

DUCTED AIR POWER PLANT

This application is a national stage completion of PCT/GB2003/002770 filed Jun. 27, 2003 which claims priority from British Application Serial Nos. 0214961.5 and 0301177.2 filed Jun. 28, 2002 and Jan. 20, 2003, respectively.

FIELD OF THE INVENTION

This invention relates to a ducted air power plant. It relates particularly to a power plant for an aircraft or airship which makes use of movable jet nozzles with variable thrust for controlling the craft's position and attitude. Alternative uses for the power plant include a platform having hovering facilities suitable for carrying equipment such as a camera or fire extinguishing chemicals. An additional possibility is the provision of a freely movable platform for providing aerial observation information.

The principle of using movable jet nozzles in an aircraft to provide initially lift-off and then forward acceleration was disclosed in patent specifications GB861480, GB3899862 and GB905651 (Hawker). These specifications describe an arrangement of vectoring nozzles which deflect the engine's thrust so that they will be turned partially downward to provide lift-off. After this stage, the nozzles are rotated to provide forward acceleration and at a sufficiently high speed the necessary lift is obtained entirely from the aircraft wings. The nozzles will then be brought into a fully aft position so that they will be devoted solely to producing the forward movement.

The transition between the nozzles being directed for vertical thrust and then rearward thrust needs to be effected with great care so that the aircraft will be maintained in a generally horizontal attitude throughout. At speeds lower than the wing borne air speed, the aircraft attitude is sometimes capable of being adjusted by secondary nozzles located at the wingtips, nose and tail which are under the control of a pilot. If side winds are present at take-off, the aircraft attitude will need to be supervised particularly carefully. In the full size aircraft, this is the mechanism that is used to maintain stability through these transitions. However, if the aircraft is represented in a model aircraft version, this mechanism is not available and all the control adjustments have to be executed by adjusting the thrust exiting from each nozzle.

The nozzle arrangement disclosed in the aforementioned specifications is the provision of four nozzles, two of which are located in front of the aircraft centre of gravity and two are located behind this point. The nozzles are positioned on the port and starboard sides of the aircraft so that a relatively stable platform will be formed.

According to the invention, there is provided a ducted air power plant, the power plant comprising a motor driven fan situated in a duct, the fan having an air intake side and in operation providing a high pressure air stream in the duct, and the fan being located adjacent air splitter means, the air splitter means being arranged to divert the airstream into two or more subsidiary streams for delivery to respective jet nozzles of the plant. Preferably, the air splitter means is an air splitter plate arranged to provide four subsidiary air streams.

The delivery of the subsidiary streams from the air splitter plate to the jet nozzles may be effected through respective air delivery tubes having a circular, elliptical or other cross-section.

The fan rotor may be located adjacent a fan stator blade unit arranged to reduce the degree of rotation (or swirl) present in the air stream leaving the fan. The air splitter plate may be located with one or more air control blades which may be moved to enable the individual flow of air to each jet nozzle to be adjusted.

Preferably, the air control blades are positioned immediately in front of the air splitter plate. Each blade may be balanced for rotation about an axis which is in line with a diagonal of the air splitter plate, such diagonal being located where it will offer minimum obstruction to the air flow through an air flow opening of the plate.

The invention also comprises a mobile platform vehicle mounted with the power plant. It further comprises an aircraft including the power plant.

BRIEF DESCRIPTION OF THE DRAWINGS

By way of example, a particular embodiment of the invention will now be described with reference to the accompanying drawings, in which:

FIG. 7 shows four views of a different embodiment of air splitter plate, FIG. 8 is a perspective view from one end of the air splitter plate showing the air control blades in place, FIG. 9 is a view of the plate from the opposite end showing the air control blades, FIG. 10 is a partial cross-sectional view showing how tilting of an air control blade can divert an air stream from one passage to another of the air splitter plate.

DETAILED DESCRIPTION OF THE INVENTION

Figure 1:
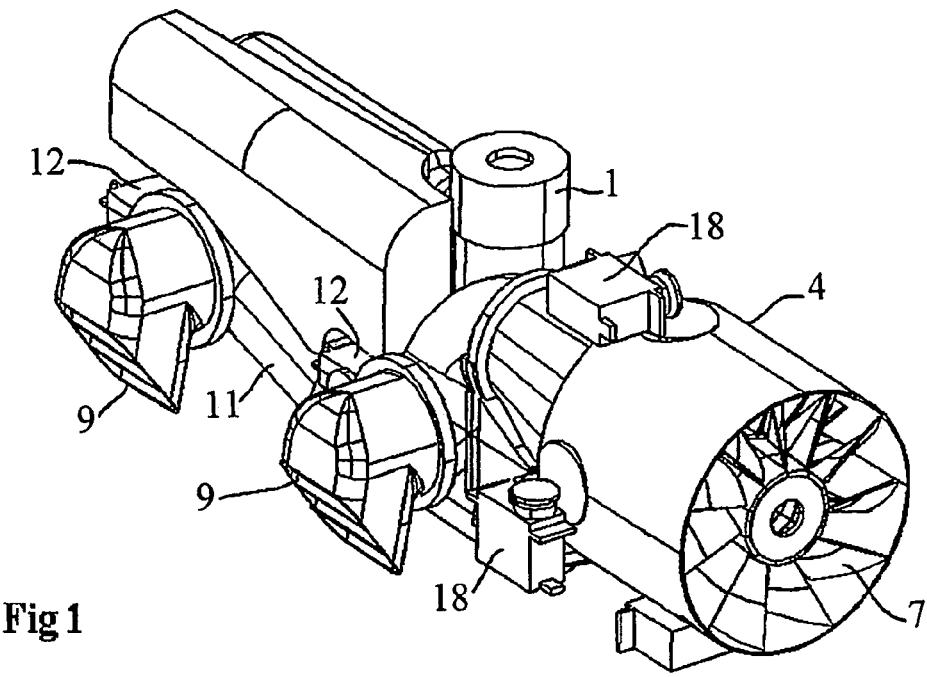
FIG. 1 is an end perspective view of the ducted air power plant.

The construction of the ducted air power plant of the invention begins with making a choice of the engine to be used. In the present example, this was a two-stroke water-cooled internal combustion engine having glow plug ignition and a rotational speed of up to 28,000 RPM. The FIGS. 1 and 2 views show the engine mounted with an axial flow fan rotor carried directly on the output shaft of the engine. In the figures, the engine has a working cylinder 1 and aligned at right angles to this the output shaft 2 is located. The engine is also provided with an exhaust silencer 3 and the usual working components including a fuel tank with carburettor. The FIG. 1 view shows the fan rotor being surrounded by a casing 4 which serves to confine the pressurised air flow produced by the fan. In the FIG. 2 view, the casing 4 is shown with a minor modification which provides a bell-shaped opening 6 at the air entry end.

Mounted at the end of the engine output shaft 2 is the fan rotor 7 the blades of which are aligned to drive air in the direction of the cylinder 1. The incoming air stream is divided into four streams by an air splitter plate 8 and these streams are delivered to adjustable jet nozzles, two of which nozzles 9 can be seen at the left hand side of the FIG. 1 view.

The nozzles 9 are located at the ends of air delivery tubes 11 which convey the four air streams from the air splitter plate 8 to the four nozzles 9. The adjustment of the nozzles is effected by rotating each nozzle 9 about the end of its delivery tube 11 so that the nozzle may be turned in order to deflect its respective air stream forwards, downwards or rearwards. The rotation of each nozzle is done by operation of a first servo motor 12 alongside the nozzle. There are four of the first servo motors 12, one being provided for each of the nozzles 9. Air guide vanes may or may not be incorporated in the ducts and/or nozzles to improve the airflow efficiency and reduce the airflow losses.

Figure 2:
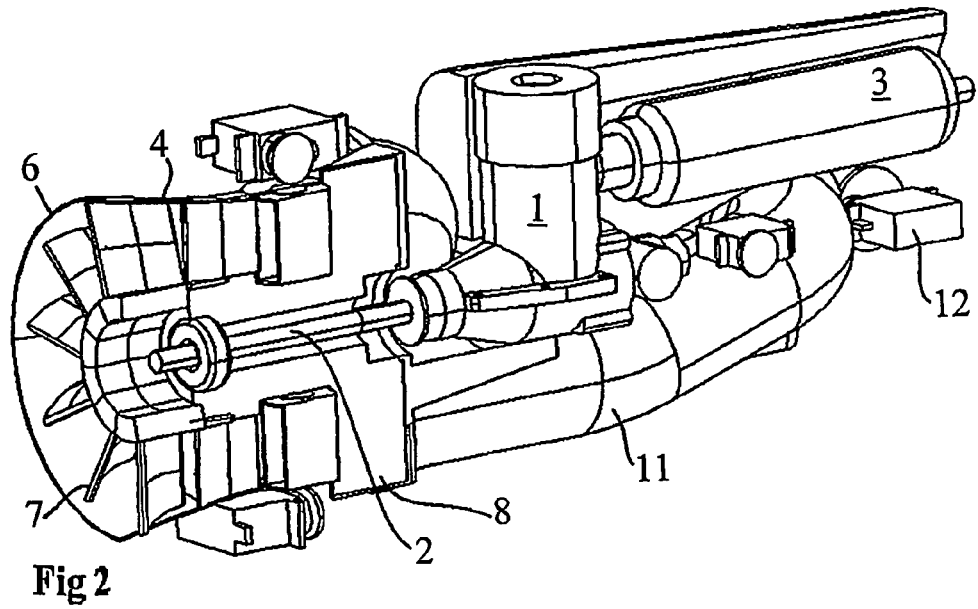
FIG. 2 is a similar view taken from the opposite side of the plant and partly cut away.
Figure 3:
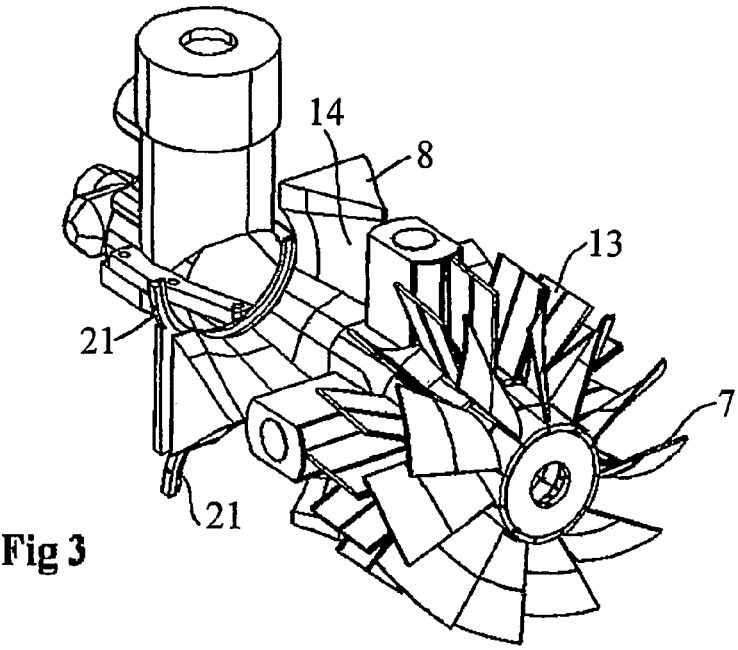
FIG. 3 shows the power plant engine with front engine casing pieces removed.

FIG. 3 shows further details of the construction where the front casing 4 pieces have been removed and the nozzles at the left hand side of the engine have been omitted. Just downstream of the fan rotor 7, a fixed blade air straightener comprising fan stator blades 13 is positioned to reduce the amount of rotation (or swirl) which is present in the air stream leaving the fan. The air splitter plate 8 is mounted across the air stream with four passages arranged such that the stream will be divided into the four separate streams for delivery to the nozzles 9 (FIG. 1). The shaping of the air splitter plate is such that the incoming air streams will be divided substantially equally into the four smaller streams in a fairly smooth and streamlined manner. This is effected partly by a funnel-like entry opening 14 being provided at the upstream side of each air splitter passage.

Figure 4:
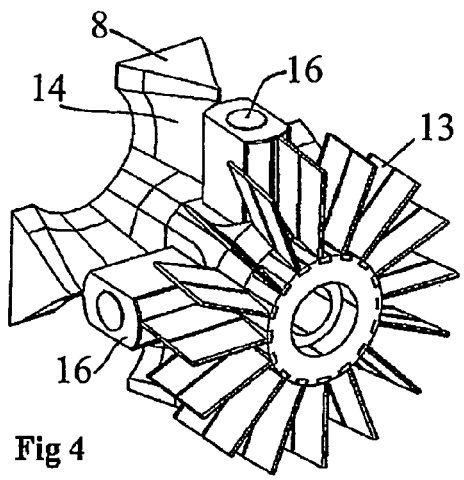
FIG. 4 depicts an air splitter plate with the ducted fan stator blades.

FIG. 4 shows the air splitter plate 8 with the ducted fan stator blades 13 mounted on a boss at the front end of the plate 8. Also at the front end of each air splitter passage, the air splitter plate supports an air control blade 16 which is mounted on a surface in front of the passages. There are four air control blades and these are positioned between each pair of passages through which the smaller air streams pass. Therefore, if an air control blade should be positioned in line with the air flow through its pair of passages then there will be an equal flow of air through the two passages. However, if an air control blade should be aligned at a small angle to the direction of air flow, then the air flow through one of the passages will be reduced whilst the flow through the other passage will be increased. There are four air splitter passages with an air control blade located between each pair of passages so this construction allows a wide degree of adjustment to be made to the volume of air passing through the individual passages.

Figure 5:
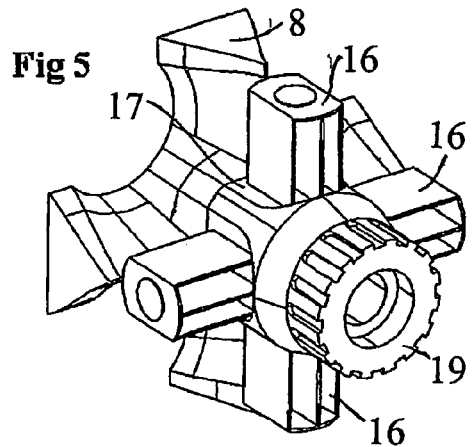
FIG. 5 shows the air splitter plate with air control blades.

FIG. 5 shows the air splitter plate 8 supporting the four air control blades 16. Each air control blade is in contact at its inner end with its surface 17 and the outer end of each blade is movable about an axis radial to the engine output shaft by a second servo motor 18 (FIG. 1). The second servo motors 18 are thus supported on the casing 4 pieces which in operation surround the fan assembly.

The air splitter plate 8 also carries the cylindrical boss 19 which is provided with splines so that the fan stator blades 13 will be able to be supported in a rigid manner. The engine output shaft 2 (FIG. 2), of course, passes through the air splitter plate 8 so that the fan rotor 7 will be able to be secured to the end of the shaft.

The downstream side of the air splitter plate 8 carries fixing means 21 (FIG. 3) by which the air delivery tubes guiding the four air streams are attached to the plate. As depicted in FIG. 1, there are two air delivery tubes 11 located on the left hand side of the engine and two further tubes (not visible in the FIG. 1 view) on the right hand side. Each of the air delivery tubes terminates in its own nozzle 9 and the two nozzles visible in the FIG. 1 view are shown directed downwards so that they will produce a jet thrust reaction tending to raise the power plant on that side. A similar effect will occur from the nozzles on the opposite side of the power plant. However, each of the nozzles is rotatable about the end of the air delivery tube which supports the nozzle. The positioning of each nozzle is adjusted by the provision of the respective first servo motor 12 for each nozzle. It will thus be possible for all of the nozzles to generate upward thrust if this is required or possibly a combination of forward and upward thrust if the nozzles have been suitably positioned by their servo motors.

Figure 6:
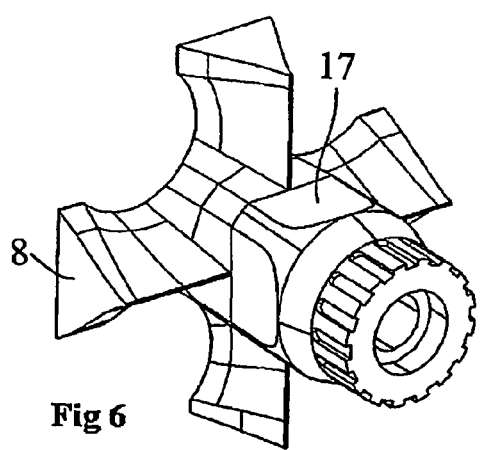
FIG. 6 shows the air splitter plate.

FIG. 6 shows the air splitter plate 8 after the air control blades 16 have been removed from the surfaces 17.

FIG. 7 shows four views of a different embodiment of air splitter plate 8. It will be seen that the two air passages on the upper portion of the plate are spaced apart from one another by a particular distance, whilst the two passages in the lower portion of the plate are spaced closely together. This arrangement allows the relevant air delivery tubes to be passed round the mass of the engine.

FIG. 8 is a perspective view from one end of the air splitter plate showing the air control blades in place.

FIG. 9 is a view from the opposite end of the air splitter plate with the air control blades in place. It will be noticed that the two sets of air control blades 16 whose tilting axis 20 is located on a horizontal line are spaced closer to the upper two air passages than they are spaced to the lower two passages. This, similarly, allows the air delivery tubes to pass round the mass of the engine.

FIG. 10 is a partial cross-sectional view of the air control blade being located between two passages in the air splitter plate 8. There are air passages located at the left hand side and right hand side of the Figure. It is apparent that the tilting of the uppermost air control blade 16 in an anticlockwise direction has caused part of the air stream that would have flowed through the right hand passage to be diverted into the left hand passage. When the air control blade is returned to a position in line with the incoming air stream this will again permit equal volumes of air to pass through both passages.

Figure 11:
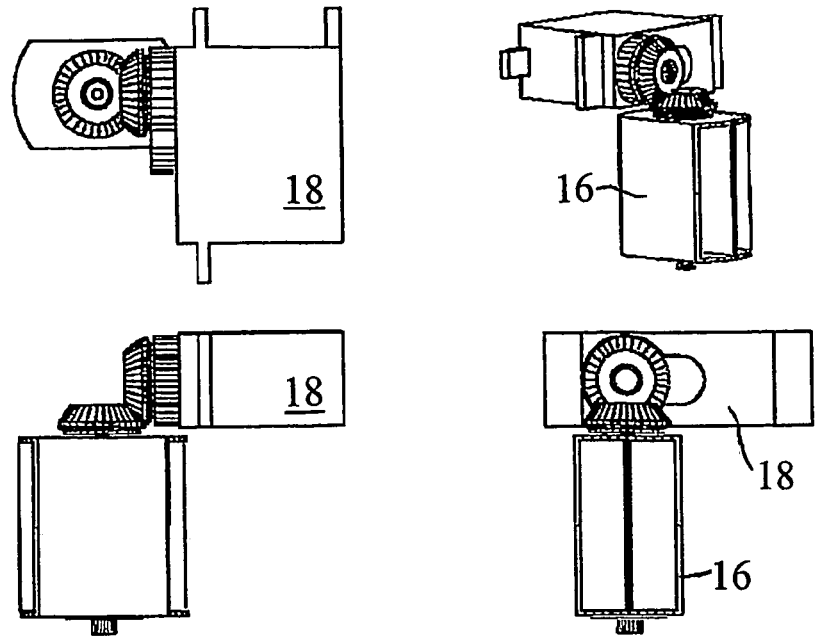
FIG. 11 shows the air control blade and servo motor combination in four views taken from different sides.

FIG. 11 shows four views of an air control blade 16 with its own second servo motor 18. The servo motor 18 has an output shaft which is connected by a bevel gear drive to its air control blade 16 so that actuation of the motor will cause the control blade to be rotated through a small angle. Each air control blade 16 is seen to have a box-like construction with a rectangular sleeve and a central partition. Each air control blade 16 thus forms two parallel passages for air streams and by rotating this box, the streams will be able to be directed to either side about the axis of the rotating action.

Figure 12:
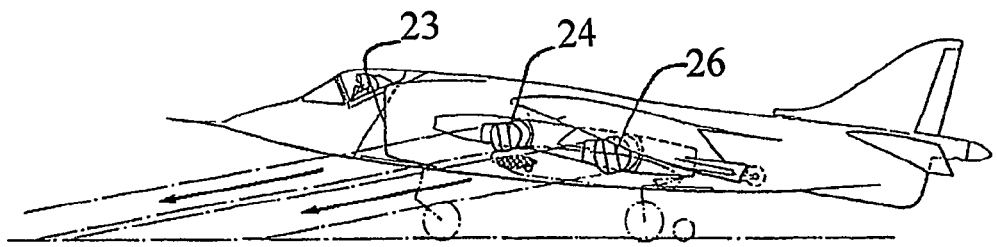
FIG. 12 shows one aircraft construction using the ducted air power plant of the invention, and, FIG. 13 is a plan view of the power plant with the nozzles directed to produce a yaw motion of the unit.

FIG. 12 shows one aircraft construction in which the ducted air power plant of the invention has been incorporated. In this instance, the aircraft is a Hawker aircraft as disclosed in one of the aforementioned patent specifications. The aircraft is of a short take off and landing design and it is provided with a forward facing air intake 23, one of these being located on each side of the fuselage. The aircraft also has two forward jet nozzles 24 and the same number of rearward jet nozzles 26. The nozzles are rotatable as already mentioned and, in the arrangement depicted in the Figure, the nozzles have been directed forward and partly downward to give reverse thrust for manoeuvring and braking purposes.

A control system for the power plant was devised which could be mounted in a model aircraft and which was capable of being operated under radio control by a standard commercially available radio transmitter. The aircraft was provided with full operational functions for motor control, rudder, elevators, ailerons, flaps, pitch and roll hover controls. The aircraft was thus able to hover and to make the transition from hover to forward flight and back again. A sensor based control system was incorporated. The first and second servo motors 12, 18 were driven by a computer controlled system so that the nozzles and the air control blades would be adjustable independently of one another. In fact, the air control blades were arranged to be controlled in pairs so that one set of air control blades will be moved simultaneously with the corresponding set of blades on the opposite side of the engine shaft.

In the construction of the ducted air power plant, it was found possible for many of the components to be made either by a carbon-fibre composite or a plastics injection moulding process in the interest of keeping weight to a minimum. The ducting, the air control blades, engine mountings, the nozzles, the rotor and stator fan units, and the air splitter plate were made by one or other of these processes. The air control blades 16 each comprise a hollow box-like construction of three aerodynamically designed blades linked by top and bottom members. Preferably, the outer blades are splayed slightly outwards to improve aerodynamic efficiency of the blades during rotation.

In operation of the ducted air power plant, this has been found suitable for incorporation in an aircraft fuselage similar to the Hawker aircraft depicted in FIG. 12. With a suitable radio control unit mounted in the aircraft to control the operation of the engine, elevators, flaps and servo motors, this can enable a flying model to be taken through realistic maneouvres. These can include vertical take-off and landing, transition to forward flight, transition back to hover, landing and flight backwards.

A further useful movement in an aircraft of this type is the yaw motion which is an angular motion of the aircraft in a horizontal plane about the normally vertical axis. In the Hawker aircraft, a couple to generate the yawing moment is provided by directing a high velocity air stream through reaction control valves located in the nose and the rear boom of the aircraft fuselage. By contrast, in the aircraft of the present invention, the yaw moment is provided by turning the two left hand fuselage side nozzles in one direction and the two hand nozzles in the opposite direction. The yaw moment is thus delivered through the use of a counter rotated nozzle alignment.

Figure 13:
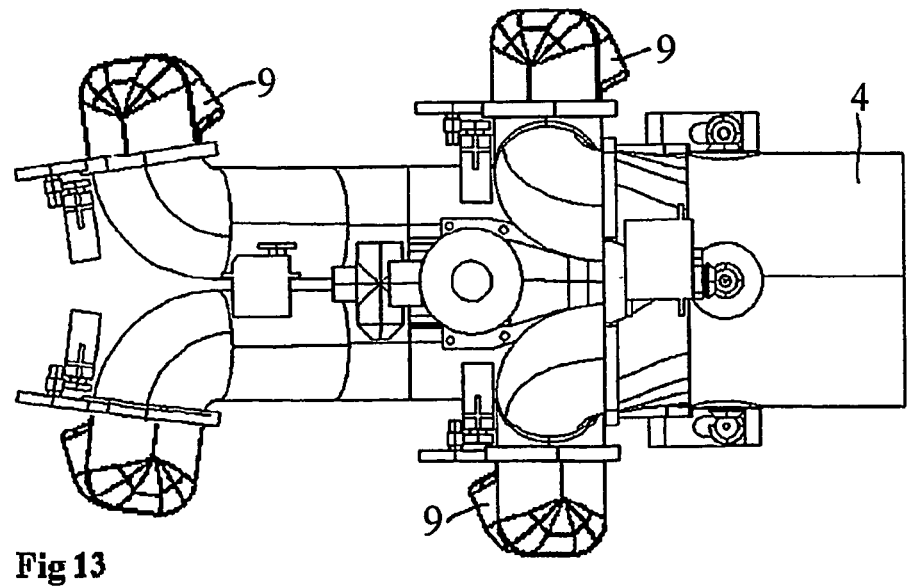

FIG. 13 gives a plan view of the power plant with the two left side nozzles 9 (on the upper part of the Figure) rotated in a forward direction and the two right side nozzles 9 (on the lower part of the Figure) rotated in a rearward direction. The thrust will thus be directed to cause the aircraft to rotate in an anticlockwise direction about the vertical axis.

Additionally, when in the hover attitude, as the aircraft moves away from its centre point in either the pitch or roll planes, the nozzles are able to be individually adjusted so that they are always positioned vertically downwards with regard to the ground surface. This provision can help to ensure that the maximum jet thrust is being delivered vertically downwards in order to sustain a stable hover of the aircraft.

The foregoing description of an embodiment of the invention has been given by way of example only and a number of modifications may be made without departing from the scope of the invention as defined in the appended claims. For instance, instead of the power source being a two stroke internal combustion engine, the source may be a brushless electric motor with a motor controller and fuel cell or rechargeable battery. A miniature gas turbine type of engine is a further possibility. In addition, the air control blade component has been described as being of a hollow box construction supporting three aerodynamic air deflector blades. In a different embodiment, the air control blade component could have more or less than this number of air deflector members.

It is also possible to provide an alternative construction of power plant where the air stream would be delivered down a central duct with movable air control blades being located diagonally opposite one another in the duct. The air control blades would then act to divert part of the stream into one or both of a left or right hand side air delivery tube. This construction thus could be used on an aircraft having only three jet nozzles.

In order to significantly improve the operating performance of the two-stroke engine and allow an indefinitely sustainable hover flight, a cooling system has been introduced for both the engine head and exhaust manifold/tuned pipe. Water, ethylene glycol or similar coolant fluid is circulated through these components by means of cooling ducts connected to a pump, the pump being either driven directly from the engine drive shaft or remotely operated by an electric motor. The hot coolant is then recirculated around a heat exchanger formed by the ducted fan shroud and air delivery tubes which are fabricated from aluminium, carbon fibre composite or similar material, having good heat conduction properties. The effect of the high speed air being forced through the inner side of this duct provides cooling to extract the required quantity of heat from the coolant fluid. A further benefit of the heat exchanger is that in expanding the air as a result of heat transfer as it travels through the rear air delivery tubes, the thrust at a jet nozzle exit will be increased to a small extent. During flight, the external skin of this heat exchanger will be exposed to air being forced over it from air entering just behind the air intakes. This effect can further increase the effectiveness of the available cooling.

The invention claimed is:

1. A ducted air power plant comprising:
    a motor-driven fan for producing a high-pressure air stream;
    air splitter means for deriving a plurality of subsidiary air streams from the high-pressure air stream;
    a plurality of vectoring air-jet nozzles; and
    means for ducted delivery of the subsidiary air streams to respective ones of the vectoring air-jet nozzles;
    the air splitter means comprises selectively-adjustable splitter means for splitting the high-pressure air-stream proportionally between the subsidiary air streams, the selectively-adjustable splitter means being selectively adjustable to vary the proportions with which the high-pressure air stream is split between the respective subsidiary air streams;
    the selectively-adjustable splitter means comprises a splitter plate, the splitter plate defining first and second duct-entry openings for receiving individual ones of the subsidiary air streams, a control-blade device mounted for angular displacement relative to the first and second duct-entry openings, and means for selectively adjusting the angular displacement of the control-blade device for varying the proportions by which air of the high-pressure air-stream is split between the first and second duct-entry openings; and
    the control-blade device comprises means defining a plurality of parallel passages for directing air of the high-pressure air stream into the first and second duct-entry openings in relative proportions dependent on the angular displacement of the control-blade device relative to the first and second duct-entry openings.

2. A ducted air power plant comprising: a motor-driven fan for producing a high-pressure air stream; air splitter means for deriving a plurality of subsidiary air streams from the high-pressure air stream; a plurality of vectoring air-jet nozzles; and means for ducted delivery of the subsidiary air streams to respective ones of the vectoring air-jet nozzles; wherein the air splitter means comprises selectively-adjustable splitter means for splitting the high-pressure air-stream proportionally between the subsidiary air streams, the selectively-adjustable splitter means being selectively adjustable to vary the proportions with which the high-pressure air stream is split between the respective subsidiary air streams, and wherein the selectively-adjustable splitter means comprises a splitter plate, the splitter plate defining four duct-entry openings for individual ones of the subsidiary air streams, four control-blade devices each associated with a respective pair of the four duct-entry openings, each control-blade device being mounted for angular displacement relative to the two duct-entry openings of its respectively-associated pair of duct-entry openings to vary the proportions by which the high-pressure air-stream is split between the two duct-entry openings of the pair of duct-entry openings associated with that respective control-blade device, and means for selectively adjusting the angular displacement of each control-blade device for varying the proportions by which the high-pressure air-stream is split between the two duct-entry openings of the pair of duct-openings associated with that respective control-blade device.

3. A ducted air power plant comprising:
   a motor-driven fan for producing a high-pressure air stream;
   air splitter means for deriving a plurality of subsidiary air streams from the high-pressure air stream;
   a plurality of vectoring air-jet nozzles; and
   means for ducted delivery of the subsidiary air streams to respective ones of the vectoring air-jet nozzles;
   wherein the air splitter means comprises selectively-adjustable splitter means for splitting the high-pressure air-stream proportionally between the subsidiary air streams, the selectively-adjustable splitter means being selectively adjustable to vary the proportions with which the high-pressure air stream is split between the respective subsidiary air streams;
   wherein the selectively-adjustable splitter means comprises a splitter plate, the splitter plate defining four duct-entry openings for individual ones of the subsidiary air streams, four control-blade devices each associated with a respective pair of the four duct-entry openings, each control-blade device being mounted for angular displacement relative to the two duct-entry openings of its respectively-associated pair of duct-entry openings, and means for selectively adjusting the angular displacement of each control-blade device for varying the proportions by which the high-pressure air-stream is split between the two duct-entry openings of the pair of duct-openings associated with that respective control-blade; and
   wherein each control-blade device comprises means defining a plurality of parallel passages for directing air of the high-pressure air stream into the two duct-entry openings of its associated pair of duct-entry openings.

4. The ducted air power plant according to claim 2, including four servo motors for controlling the angular displacements respectively of the four control-blade devices.

5. The ducted air power plant according to claim 2, including straightening blades for straightening flow of high-pressure air from the motor-driven fan.

6. A craft having a VTOL capability, the craft incorporating a ducted air power plant, and the ducted air power plant comprising: two pairs of vectoring air-jet nozzles, the two nozzles of each pair being spaced apart laterally on opposite sides of the craft and the two pairs of nozzles being spaced apart forward and rearward of the craft; a motor-driven fan for producing a high-pressure air stream; air splitter means for splitting the high-pressure air stream into four subsidiary air streams; and means for ducted delivery of the four subsidiary air streams to the four vectoring air-jet nozzles respectively; wherein the air splitter means comprises selectively-adjustable splitter means for splitting the high-pressure air-stream proportionally between the four subsidiary air streams, the selectively-adjustable splitter means being selectively adjustable to vary the proportions with which the high-pressure air stream is split between the four subsidiary air streams; and wherein the nozzles of the four vectoring air-jet nozzles are vectored by respective servo-motor controls, and wherein the selectively-adjustable splitter means comprises a splitter plate, the splitter plate defining four duct-entry openings for individual ones of the subsidiary air streams, four control-blade devices each associated with a respective pair of the four duct-entry openings, each control-blade device being mounted for angular displacement relative to the two duct-entry openings of its respectively-associated pair of duct-entry openings to vary the proportions by which the high-pressure air-stream is split between the two duct-entry openings of the pair of duct-entry openings associated with that respective control-blade device, and means for selectively adjusting the angular displacement of each control-blade device for varying the proportions by which the high-pressure air-stream is split between the two duct-entry openings of the pair of duct-openings associated with that respective control-blade.

7. A craft having a VTOL capability, the craft incorporating a ducted air power plant, and the ducted air power plant comprising: two pairs of vectoring air-jet nozzles, the two nozzles of each pair being spaced apart laterally on opposite sides of the craft and the two pairs of nozzles being spaced apart forward and rearward of the craft; a motor-driven fan for producing a high-pressure air stream; air splitter means for splitting the high-pressure air stream into four subsidiary air streams; and means for ducted delivery of the four subsidiary air streams to the four vectoring air-jet nozzles respectively; wherein the air splitter means comprises selectively-adjustable splitter means for splitting the high-pressure air-stream proportionally between the four subsidiary air streams, the selectively-adjustable splitter means being selectively adjustable to vary the proportions with which the high-pressure air stream is split between the four subsidiary air streams; and wherein the nozzles of the four vectoring air-jet nozzles are vectored by respective servo-motor controls;
   wherein the selectively-adjustable splitter means comprises a splitter plate, the splitter plate defining four duct-entry openings for individual ones of the subsidiary airstreams, four control-blade devices each associated with a respective pair of the four duct-entry openings, each control-blade device being mounted for angular displacement relative to the two duct-entry openings of its respectively-associated pair of duct-entry openings, and means for selectively adjusting the angular displacement of each control-blade device for varying the proportions by which the high-pressure air-stream is split between the two duct-entry openings of the pair of duct-openings associated with that respective control-blade; and
   wherein each control-blade device comprises means defining a plurality of parallel passages for directing air of the high-pressure air stream into the two duct-entry openings of its associated pair of duct-entry openings.

* * * * *